United States Patent [19]
Wood

[11] Patent Number: 4,529,429
[45] Date of Patent: Jul. 16, 1985

[54] DIGITAL GLASS FORMING MACHINE

[75] Inventor: Charles L. Wood, Muncie, Ind.

[73] Assignee: Ball Corporation, Muncie, Ind.

[21] Appl. No.: 492,099

[22] Filed: May 6, 1983

[51] Int. Cl.³ ............................................. C03B 9/40
[52] U.S. Cl. .......................................... 65/29; 65/158;
 65/163; 65/DIG. 13; 364/473; 364/483
[58] Field of Search ............... 65/158, 163, DIG. 13,
 65/29; 364/473, 483

[56]  References Cited
U.S. PATENT DOCUMENTS

| 4,313,750 | 2/1982 | Lulejian et al. | 55/163 X |
| 4,357,157 | 11/1982 | Cardenas-Franco et al. | 65/163 X |
| 4,400,192 | 8/1983 | Farkas | 65/163 X |
| 4,427,431 | 1/1984 | Mumford et al. | 364/473 X |

OTHER PUBLICATIONS

Maul Brothers, Maul Technology, Electronic Pushers—Brochure—undated.

Primary Examiner—Arthur Kellogg
Attorney, Agent, or Firm—Gilbert E. Alberding

[57] ABSTRACT

The present invention relates to the precise control of components in a glass forming machine. The components are driven through mechanical linkage to digitally responsive motor modules. Data corresponding to the desired motion envelope of the component is then stored in a storage means. The digitally responsive motor modules are under the control of a component controller which is actuated by a conventional electronic controller. The component controller provides inputs to the digitally responsive motor modules in accordance with the stored data to provide precise and repeatable control over the motion envelope of the component.

5 Claims, 11 Drawing Figures

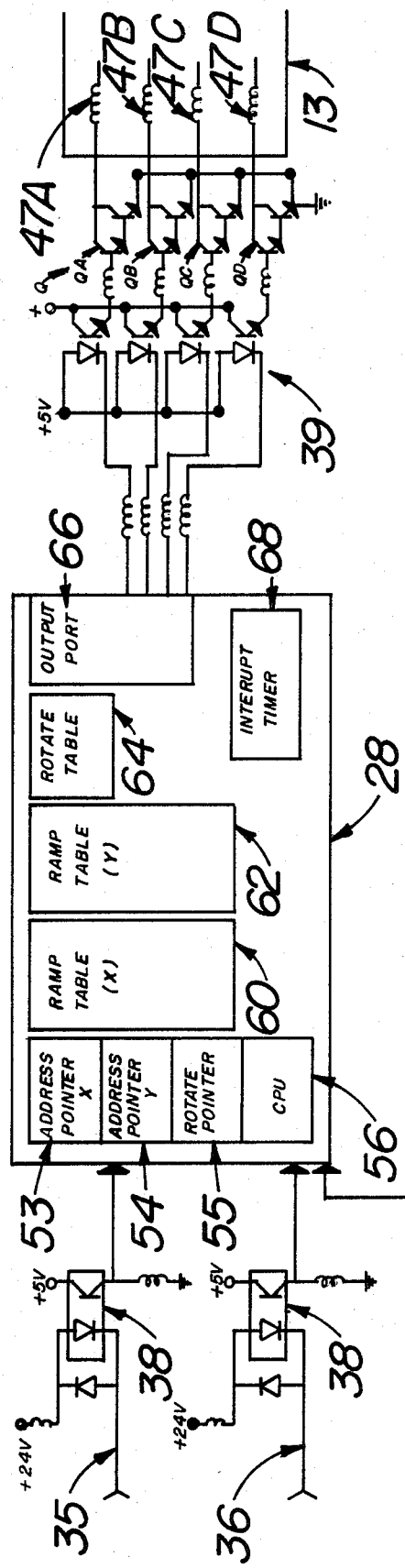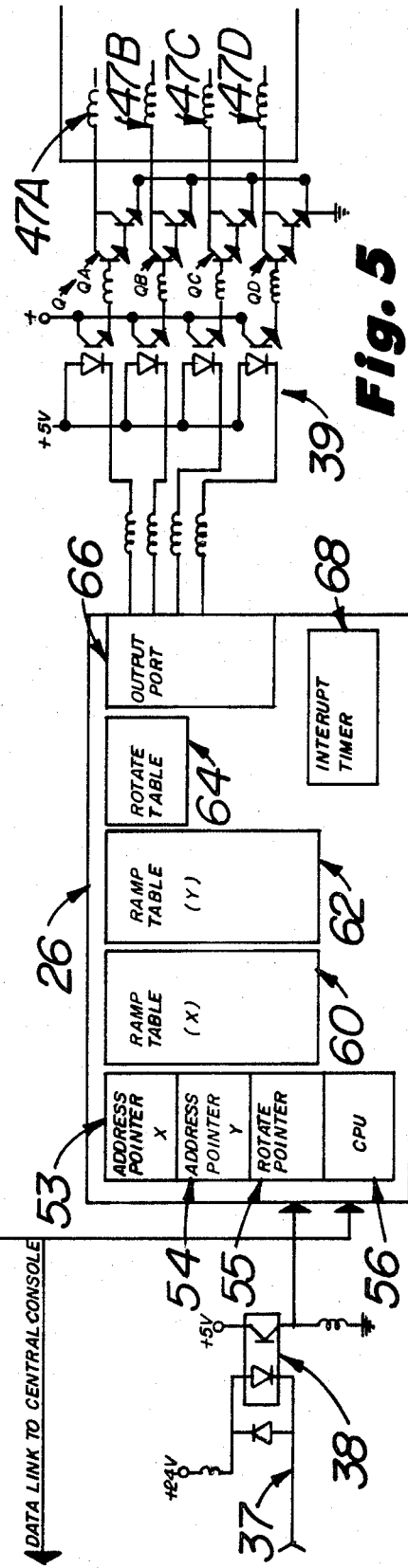
Fig. 5

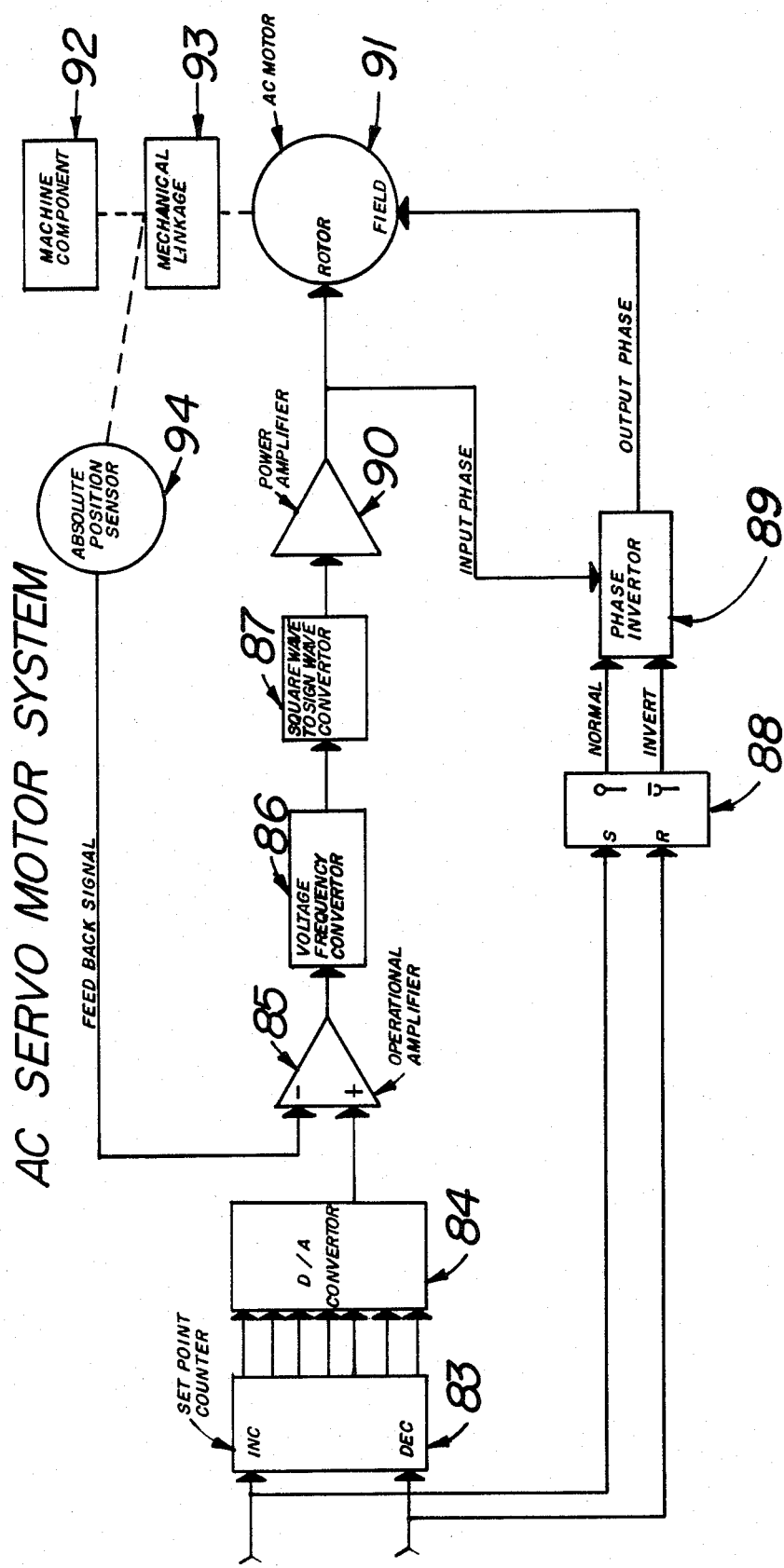

DIGITAL GLASS FORMING MACHINE

BACKGROUND OF THE INVENTION

1. Field of the Invention

The present invention relates to the electronic control of glass forming machines and more particularly, to the precise and programmable control over at least some of the components of an individual section glass forming machine.

2. Description of the Prior Art

Typically a glass forming machine comprises a plurality of individual sections which perform identical functions only at a phase differential between each other. Each section includes a plurality of cyclically moving components which are pneumatically activated to perform the respective steps in a glass forming process. Although the basic glass forming steps have undergone very little change over the past decades, highly sophisticated control systems have evolved to control the execution of these steps thereby allowing increased production speed, greater reliability, reduced waste, closer tolerances in produced ware and greater speed in setting up a machine for a change in job.

One aspect all individual section machines have in common is that the pneumatically activated components are controlled through a plurality of associated valves which are generally located in a valve block. The activation of the valves in the block has typically been effected by a mechanical timing drum driven in synchronism with a gob feeding mechanism. Respective projecting cam members are disposed in annular grooves in the drum surface and mechanically cooperate with the valves to effect their respective activation and deactivation. Relative timing between events in the machine cycle are adjusted by the relative position of the respective cam members in the annular grooves. For a basic description of such a glassware forming machine, reference is made to U.S. Pat. No. 1,911,119 issued May 23, 1933 to H. W. Ingle.

Electronic sequencing of the respective elements of the glassware forming machine is now emerging. For a description of electrically controlled glassware forming machinery reference is made to U.S. Pat. No. 3,762,907, issued Oct. 2, 1973 to Quinn and Kwiatkowski, and U.S. Pat. No. Re. 29,642, reissued May 23, 1978 to Kwiatkowski and Wood (both commonly assigned with the present invention). Briefly, in electronically controlled glassware forming machines activation signals are generated by an electronic controller to selectively activate or deactivate solenoid operated valves to effect timed operation of the components which perform the glassware forming steps. These electronic controllers provide much more precision in the respective time in a cycle that a valve is activated and allow small adjustments in such times to be easily made. Also job changes, where the complete timing of almost all components is altered, are quickly and easily made. The more sophisticated modern controllers function similarly to these controllers but use digital computers to further enhance operator interface with the machine and provide a variety of other convenience features. Although the glass forming art has been considerably forwarded by such devices, their main limitation is that they can only provide an activation or deactivation signal at a given time in a cycle. They exert no control over the actual motion envelope of the respective component.

As those skilled in the art will appreciate, there are certain steps in the glass forming process where the motion of the component must be precisely controlled if acceptable ware is to be produced. Furthermore, the desired motion of such components may vary depending on the job. For example the invert of a parison from the blank side to the mould side must be smoothly accomplished at a given speed or the acceleration forces on the parison will result in a deformation of the soft glass. Bigger ware requires a slower speed as the centrifugal forces are greater, and a job change from smaller to bigger ware will require a change in the speed of the component which effects the revert step.

Presently, the motion envelope is controlled to a great extent through dampening of the individual pneumatic cylinders and by controlling the flow of air from the cylinders on their exhaust strokes to limit their speed of movement. One method of speed control is executed in the valve block. Activation of a solenoid valve allows air to flow through a one-way check valve in the valve block to the pneumatic cylinder thereby extending the cylinder. When the valve is deactivated and the component is returned to its original position, the one-way check valve closes and the air is forced to flow through an adjustable needle valve in the valve block. The needle valve may be adjusted to limit the flow of air from the pneumatic cylinder on the exhaust stroke and correspondingly limit the speed of the cylinder. Many of the components on a glass forming machine are activated through double-acting cylinders. The speed of such components is also affected by the air pressure connected to the valve. An example of a state of the art valve block which is adapted for electronic control is disclosed in Lowe, U.S. Pat. No. 4,293,004 which is herein incorporated by reference. The Lowe patent is commonly assigned with the present invention. A novel approach to regulating air pressure into the cylinder and the flow or exhaust is illustrated in FIG. 1 of the Lowe patent.

Although the Lowe valve block and other similar arrangements in conjunction with individual dampening of the respective pneumatic cylinders and electronic control allow a great deal of control over the motion envelope of a given component, they have a number of drawbacks. Any changes in the range of motion of a component, although rare, must still be individually adjusted at the machine. The controller and valve block can only turn an air supply on and off and limit the flow of air in and out of a cylinder. The acceleration, deceleration and velocity of a component must be adjusted by on-the-spot trial and error. Job changes requiring a change in the motion envelope of a component require a large degree of experimentation by the operator. Due to the large volume of air flow even a single forming machine uses it is often desirable to operate with unfiltered air. In the typical operation of the I.S. machine various condensation, cylinder oil, sludge and varnish from the compressor tend to find their way into the air lines. Such foreign materials may play havoc with the fine adjustment of a needle valve requiring constant operator adjustment of speed for some critical components.

Perhaps most importantly, it is thought that precise control over the motion envelopes of at least some of the more critical components of a glass forming machine will allow further increases in production speed, a further reduction in waste or defectively produced containers, and possibly breakthroughs in lightweight container technology.

SUMMARY OF THE INVENTION

In accordance with the present invention it is proposed to precisely control the motion envelope of at least some of the components which perform the critical steps of the glass forming process. The present invention will allow, within negligible tolerances, positive control over timing, acceleration, velocity and deceleration of desired components in a glass forming machine. In a preferred embodiment the present invention would eliminate all pneumatic cylinders in the typical glass forming machine, the associated valve blocks and the need for a high volume source of costly compressed air.

In its broadest aspects the present invention provides for precise and programmable motion control over at least one of the cyclically movable components in a glass forming machine which execute critical steps in the glass forming process. The desired component is driven by a digitally responsive motor module which is controlled by an electronic controller, preferably of the digital microcomputer type, which provides inputs to said motor in accordance with stored ramping functions. The motion of a given component may be initiated by any of the present generation electronic controllers such as that described in U.S. Pat. No. Re. 29,642 reissued May 23, 1978, to Kwiatkowski and Wood which patent is incorporated herein by reference.

Accordingly, it is an object of the present invention to provide precise control over the motion envelope of the components of a glassware forming machine which execute critical steps in the forming process.

It is another object of the present invention to provide complete repeatability of a desired motion envelope.

It is another object of the present invention to provide for remote changes in the cushioning of a component.

It is another object of the present invention to reduce downtime for job changes by providing for programmable control of the motion envelope of selected components of a glass forming machine which control can be derived from past fine-tuned job histories.

It is another object of the present invention to reduce the air volume requirements and noise of the typical glassware plant.

It is another object of the present invention to eliminate the dependence of critical components on precise control over air pressure and exhaust.

It is another object of the present invention to eliminate the constant adjustments which an operator must make to the critical components of a glass forming machine due to changes in air pressure, ambient temperature and wear of the respective cylinder.

BRIEF DESCRIPTION OF THE DRAWINGS

FIG. 5 is a schematic drawing of two individual function microcomputers connected to stepper motors which may be used in the preferred embodiment of the present invention.

FIG. 11 is a block diagram of an A.C. servo motor system which may be utilized as a digitally responsive motor module in accordance with the subject invention.

DETAILED DESCRIPTION

Figure 1:
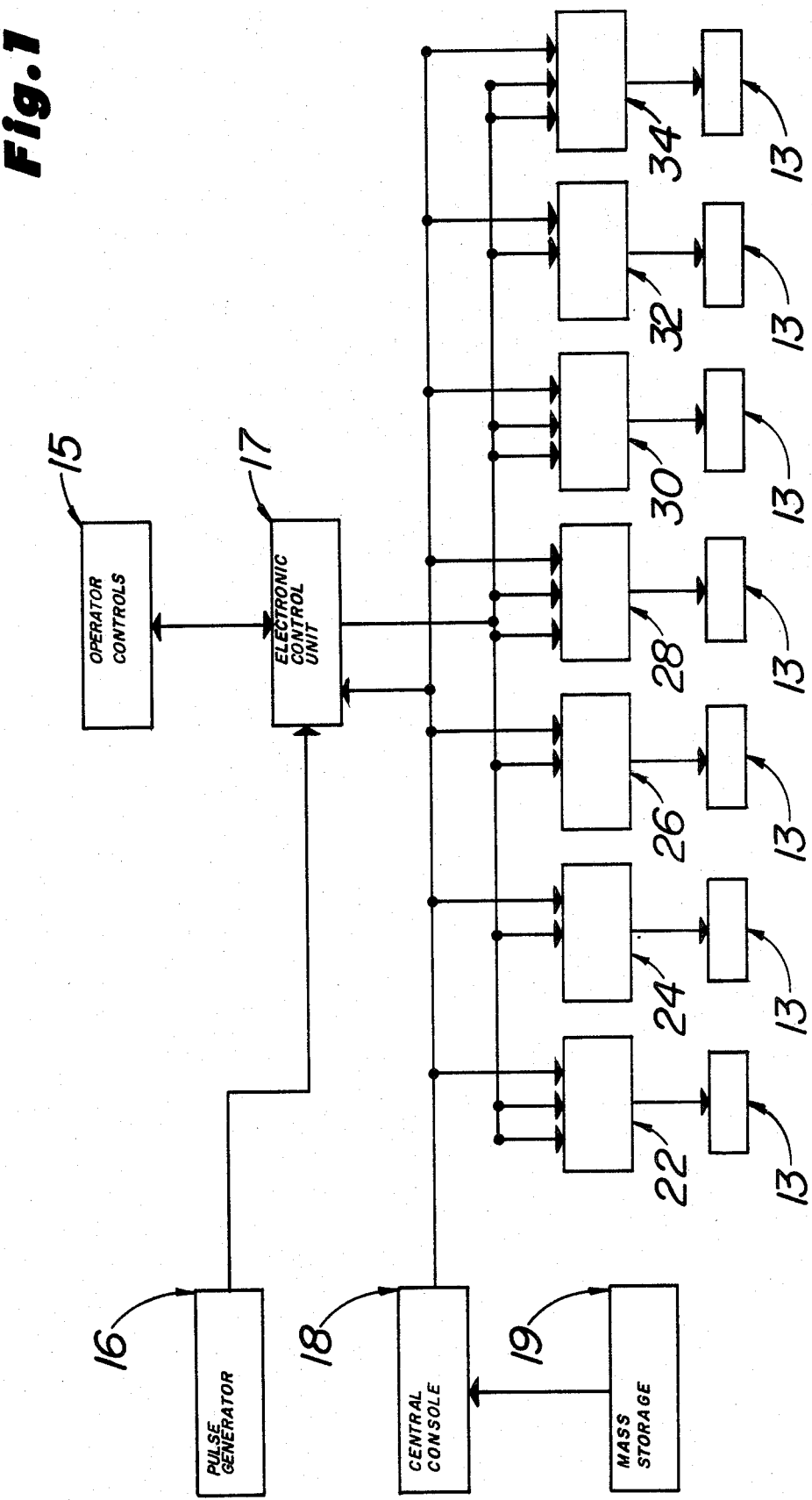
FIG. 1 is a block diagram of a prior art electronic control systems interface with the present invention.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

Referring to FIG. 1, a simplified block diagram illustrating the interface of the present invention to prior art electronic control units is shown. Although a variety of electronic controllers are available for controlling glass forming machines, the preferred embodiment of the subject invention utilizes a unit comprising a dedicated section control unit for each section of the glass forming machine as fully disclosed in U.S. Pat. No. Re. 29,642 reissued to Kwiatkowski and Wood and herein incorporated by reference. The above patent is commonly assigned with the subject application.

As is described above in the Background of the Invention, present electrqnic controllers, irrespective of the particular design, all provide activation signals to selectively activate or deactivate solenoid operated valves to effect precise initiation of movement of the various components in an individual section machine. The basic block makeup of such systems is shown in FIG. 1 and includes an electronic control unit 17, operator controls 15 for changing timing and starting and stopping the I.S. machine, a central console 18 and mass storage 19 for programming and/or providing data to the electronic control unit 17, and a pulse generator 16 for providing timing signals to the electronic control unit in synchronization with the movement of certain components of the glass forming machine including the plunger, shears, and molten glass distributor.

Figure 2:
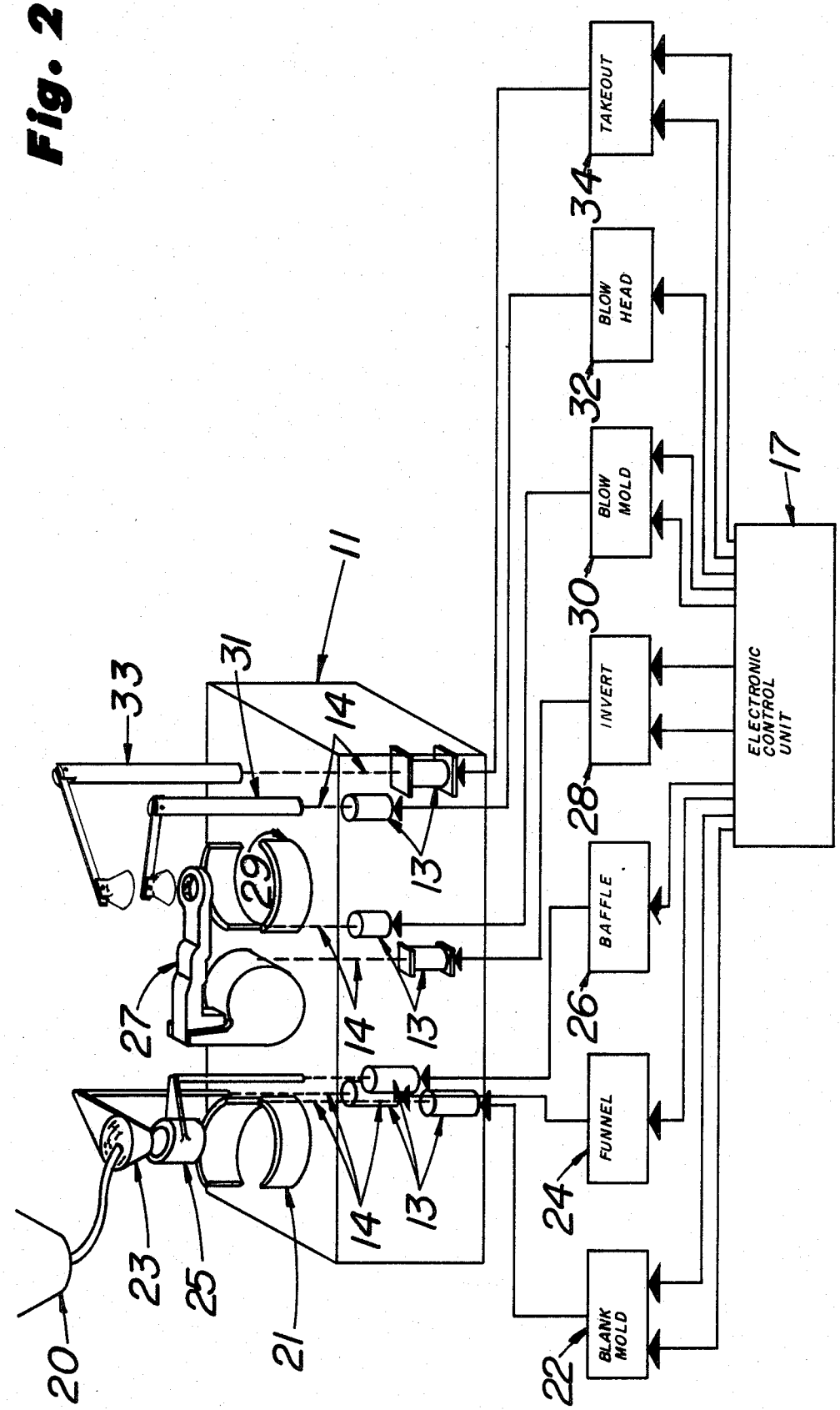
FIG. 2 is a schematic representation of a present I.S. machine having the majority of its components driven by digitally responsive motor modules in accordance with the present invention.

Referring to FIG. 2, a simplified schematic drawing of an individual section of a glass forming machine adopted for use with the present invention is illustrated. The individual section is generally referenced 11 and has a majority of its components driven by digitally responsive motor modules 13, rather than the conventional pneumatic cylinders. As used herein, the term "digitally responsive motor modules" includes analogue motors which are ultimately digitally controlled, such as D.C. servo or variable frequency A.C. types which are controlled by sending stepped voltage levels to the motor and by using conventional feedback control nulling the motor to the new input level.

The components of the section are schematically represented and include blank mould 21, funnel 23, baffle 25, invert-revert mechanism 27, blow mould 29, blow head 31 and takeout arm 33. The mechanical linKages between each of the motor modules 13 and the various components are symbolized by dotted lines 14. These may be standard types of mechanical linkages well known in the art and may include rack-and-pinion drives, cams, direct connection to a component which rotates, gearboxes and the various other mechanical linkages.

Present individual section glass forming machines include various other components, such as a thimble and plunger, depending on the type of machine and the specific work which the machine is set up to run. These variations are well appreciated by those skilled in the art. As will be appreciated by a reading of the subject specification, such other components may also be precisely controlled by the present invention.

Molten glass is fed to the individual section from the furnace through a mechanical plunger, shears and distributor arrangement, all being generally referenced 20 in FIG. 2. A single set of these components will often service between 6 and 12 sections in a glass forming machine. The individual sections are synchronized to the plunger and shears through pulse generator 16 in FIG. 1. The pulse generator may be of the shaft encoder type or of a variety of other types which provide synchronization between the individual section components and the rest of the glass forming system.

In the preferred embodiment a plurality of component controllers or individual function microcomputers are provided, one for each motor module, and each is dedicated to the control of the motion envelope of a particular component of the glass forming machine. In FIGS. 1 and 2 each component controller or individual function microcomputer is illustrated as a separate block and is labeled according to the component whose motion is controlled. In accordance with the above the individual function microcomputer controlling the motion envelope of the blank mould is referenced 22, the funnel 24, the baffle 26, the invert-revert mechanism 28, the blow mould 30, the blow head 32 and the takeout arm 34.

A prior art section electronic control unit 17 is connected to each of the component controllers and provides signals for the initiation of movement of the various components of the glass forming machine. The section control unit is programmable and receives data indicative of the relative initiation times of the various components from a central console 18, (FIG. 1) which includes a mass storage device such as floppy disks or tape drive. The individual function microcomputers are also preferably connected to central console 18. Each individual function microcomputer includes sufficient storage for a control program and data to provide drive signals to the digitally responsive motor modules such that the desired motion envelope of the driven component is achieved.

Referring to FIG. 5, a schematic diagram of individual function microcomputers 26 and 28 is illustrated along with said individual function microcomputers respective connections to digital motor modules 13 which are stepper motors in the preferred embodiment. The individual function microcomputers schematically illustrated in FIG. 5 include three data tables labeled Ramp Table (X) referenced 60, Ramp Table (Y) referenced 62, and Rotate Table referenced 64. The individual function microcomputer also includes a CPU 56, an output port 66, an Address Pointer X referenced 53, an Address Pointer Y referenced 54 and a Rotate Pointer referenced 55. Inputs to the individual function microcomputer are received on lines 35, 36 and 37 from a prior art electronic control unit such as 17 in FIGS. 1 and 2. As such prior art electronic control units are typically designed to provide a 24-volt output to solenoid valves, an optical isolater circuit 38 is included to isolate the 24-volt actuation signal from the 5-volt computer inputs and to further prevent interference from electrical noise spikes.

As will be explained below, some of the individual function microcomputers in the present invention will have two inputs from the prior art electronic control unit, such as individual function microcomputer 28, while others will only have a single input, such as individual function microcomputer 26.

A digitally responsive motor module, referenced 13, is connected to the output of the individual function microcomputers. As illustrated in FIG. 5, the preferred embodiment utilizes stepper motors which have four discrete coil windings 47A, 47B, 47C and 47D which are respectively energized by driver transistors QA, QB, QC and QD. The stepper motors in actuality may have a great number of coils which are serially connected to form four discrete groups of coil systems which may be electrically represented as shown. The driver transistors are activated by the output of the individual function microcomputer through optical isolation circuits 39.

As will be readily appreciated by those skilled in the art, the hardware implementation of the individual function microcomputers may take on a variety of configurations wherein some or all of the data tables and pointers may be external to the actual microcomputer. It would, of course, also be possible to implement the present invention with a large number of discrete logic chips.

Referring again to U.S. Pat. No. Re. 29,642, which is herein incorporated by reference and particularly to FIGS. 3 and 6 of said patent, the inputs on lines 35, 36 and 37 to the individual function microcomputers may be derived from the flip-flop latches referenced 76 in said patent. These latches are set upon an activation signal for a given component from the electronic control unit. Setting of the latches results in a continuous electrical signal of +24 volts which activates a solenoid operated pneumatic valve in present glass forming machines. The latches are reset upon a deactivation signal for said component from the electronic control unit. The reset of the latch turns off the signal allowing the solenoid operated pneumatic valve to return to its closed position turning off the air supply to the cylinder.

Although the preferred embodiment of the present invention utilizes stepper motors, as will be appreciated by those skilled in the art, it would also be possible to implement the presnt invention with synchronous motors and variable frequency drives, or with servo motors utilizing closed-loop feedback control.

Figure 9:
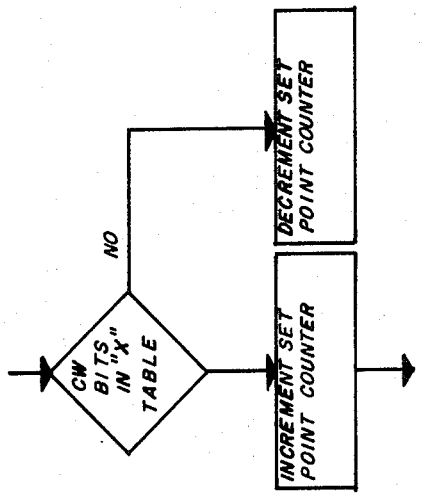
FIG. 9 is a flow diagram illustrating a subroutine for controlling the direction of a D.C. or A.C. digitally responsive motor module system in executing the flow diagram of FIGS. 6 and 7.

For an example of a D.C. servo motor control system adopted for use with the present invention, reference is made to FIG. 9. A set point counter 72 is incremented or decremented under program control of the associated individual function microcomputer. The set point counter then outputs a new binary count to the input of a digital to analogue converter 73 which in turn outputs a representative analogue voltage level to a power operational amplifier 75. The power operational amplifier 75 then drives a D.C. servo motor 78 in the proper direction to change the analogue feedback signal from an absolute position sensor 76 until it is equal to the analogue output of the digital to analogue converter. The absolute position sensor 76 is illustrated connected to machine component 80 which is driven by D.C. servo motor 28 through mechanical linkage 79.

Figure 10:
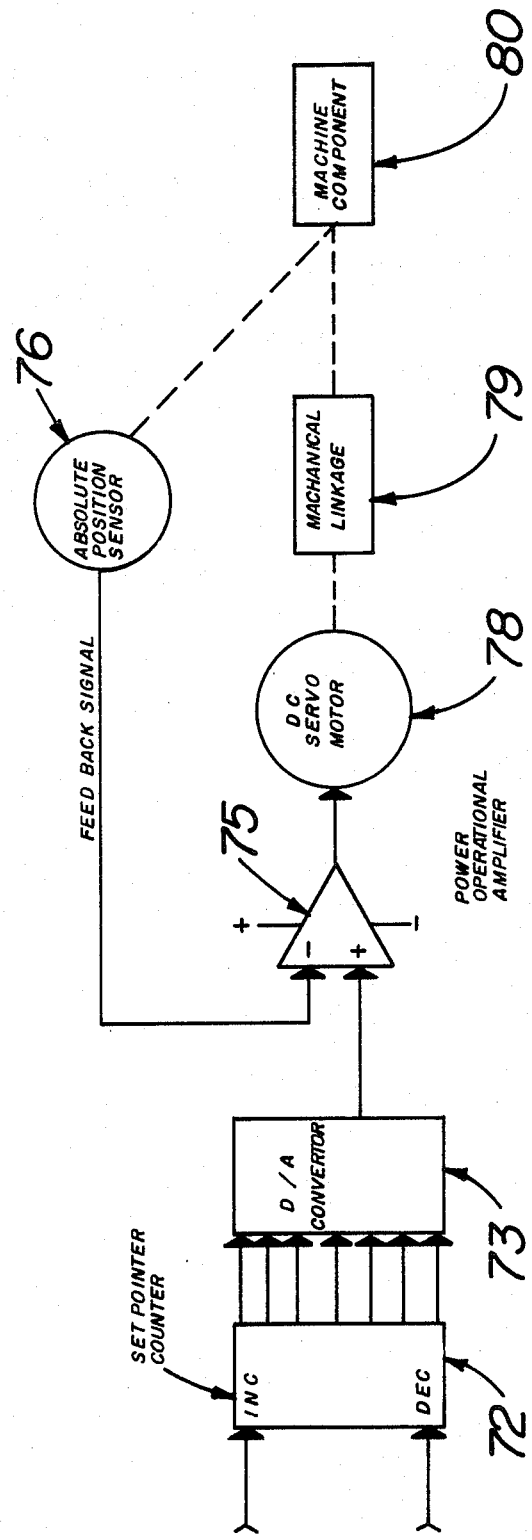
FIG. 10 is a block diagram of a D.C. servo motor system which may be utilized as a digitally responsive motor module in accordance with the subject invention.

For an example of an A.C. motor control system adopted for use with the present invention, reference is made to FIG. 10. A set point counter 83 is incremented or decremented and a motor rotation direction flip/flop is set or reset under program control from the associated individual function microcomputer. The set point counter then outputs the new binary count to the input of a digital to analogue (D/A) converter 84 which in turn outputs a representative analogue voltage level to an operational amplifier 85. The operational amplifier then drives a voltage to frequency converter 86. The output square wave from the voltage to frequency converter 86 is then converted to a simulated sine wave signal using a square wave to sine wave converter circuit 87. The simulated sine wave is then amplified in a power amplifier circuit 90 and sent to the rotor coil winding of the A.C. motor 91. The simulated sine wave is also sent to the field coil winding of the A.C. motor 91. The signal sent to the field coil winding will be in phase or 180 degrees out of phase with the rotor signal depending upon the status of motor rotation direction flip/flop 88. This determines the direction of rotation of the A.C. motor. The motor drives machine component 92 through a mechanical linkage 93 until a feedback signal is produced by absolute position sensor 94 which equals the output of the digital to analogue converter 84.

Figures 3, 4:
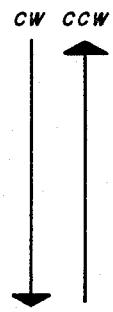
FIG. 3 illustrates data tables used in accordance with one embodiment of the present invention.
FIG. 4 is a rotation table which is required for driving the stepper motors of the preferred embodiment.

The operation of the stepper motors utilized in the preferred embodiment of the subject invention may be described by referring to the rotate table of FIG. 4 and the schematic diagram of the stepper motors in FIG. 5. The values of the transistor drivers Q are given in the columns of the table in FIG. 4 for clockwise and counterclockwise rotation of the stepper motors.

For example, if the last position of the stepper motor resulted from energization of the drivers according to row A of FIG. 4, i.e., drivers QA and QC energized and drivers QB and QD unenergized, a counterclockwise step in rotation would result from energizing the drivers according to row A+3 while a clockwise step in rotation would result from energizing the drivers in accordance with row A+1 of FIG. 3. It can, therefore, be seen that the rotation of the stepper motor is controlled by the appropriate energization of the four drivers by the individual function microcomputer in accordance with the rotate table of FIG. 4.

Presently, stepper motors are available in a variety of configurations including electric-hydraulic stepping motors and electric-hydraulic stepping cylinders. The motors are capable of torques in excess of 2,000 inch pounds with a resolution over 400 steps per revolution and speeds in excess of 2,000 RPM. The cylinders, which may essentially take the place of presently used pneumatic cylinders in the subject invention, are available in a wide variety of stroke lengths with resolutions to 0.0005 inch per step available and speeds to 300 inches per minute. It should be noted that the field of stepper motors is being rapidly advanced with new innovations appearing on the market frequently.

Referring to FIG. 3, a data table is illustrated for controlling the motion of a digitally responsive motor module through N steps in accordance with a program to be described. Each step of motion of the motor module is assigned two 8-bit words in the data table. The first bit of each word is used to indicate if motion is to be initiated, ended or to proceed in a clockwise or counterclockwise direction. For example, if the first bit of each of the 8-bit words is 0, the individual function microcomputer will recognize that it is at the beginning of a motion envelope, as may be seen by the word referenced X in the Ramp Table (X) and by the words referenced Y+N+1 in Ramp Table (Y). Alternatively, if the first bit of each word is 1, as illustrated in word X+N+1 of Ramp Table (X) and in word Y of the "function off" Ramp Table (Y), the individual function microcomputer will recognize that it has completed a motion envelope and stop the stepper motor. The direction of rotation of the step is indicated by placing one (1) in the appropriate first bit of the two words. As shown in FIG. 3, if a 1 is placed in the first digit of the first word, rotation will be clockwise, while if a 1 is placed in the first digit of the second word, rotation will be counterclockwise. The remaining 14 bits of the two words which define a single step of motion are used to indicate a 14-bit binary number. These bits are called "rate bits" and, as will be more fully explained below in the discussion of FIG. 6, determine the period of time before the individual function microcomputer initiates the next step of movement. This is accomplished by cycling the microcomputer the number of times indicated by the 14-bit number prior to reading the next two 8-bit words and proceeding to the next step. It should be appreciated that the two data tables Ramp Table (X) and Ramp Table (Y) are designed to be complementary and linked together. That is, Ramp Table (X) will control the motion of the component in its first mode of movement. Ramp Table (Y) will control the motion of the component in its second mode of movement back to its original position. The preferred embodiment of the present invention contemplates that there will be an identical number of steps in each mode of movement. Therefore, in moving through the first mode of movement, each incrementation of the X table pointer will be accompanied by an incrementation of the Y table pointer. The data referenced X in Ramp Table (X) indicates the start position of the stepper motor while the data referenced Y in Ramp Table (Y) indicates the end of the second mode of movement. Likewise, the data referenced X+1 in Ramp Table (X) controls the first step of motion in the first mode while the data referenced Y+1 in Ramp Table (Y) controls the last step of motion in the second mode of movement. As should be appreciated by the above, the use of such ramp tables to control the motion of the component assures precise control over movement, velocity and acceleration. Typically, the first step will have a relatively large rate bit number. The succeeding steps will have rate bit numbers which successively decrease in absolute value, accelerating the component until maximum velocity is reached in the middle of the mode of movement. The rate bit numbers will then begin to increase in absolute value, decelerating the component, until the end of the respective ramp table is reached and the component is stopped. Such ramp tables allow precise tailoring of the motion envelope of the various components in a repeatable method.

Figure 6:
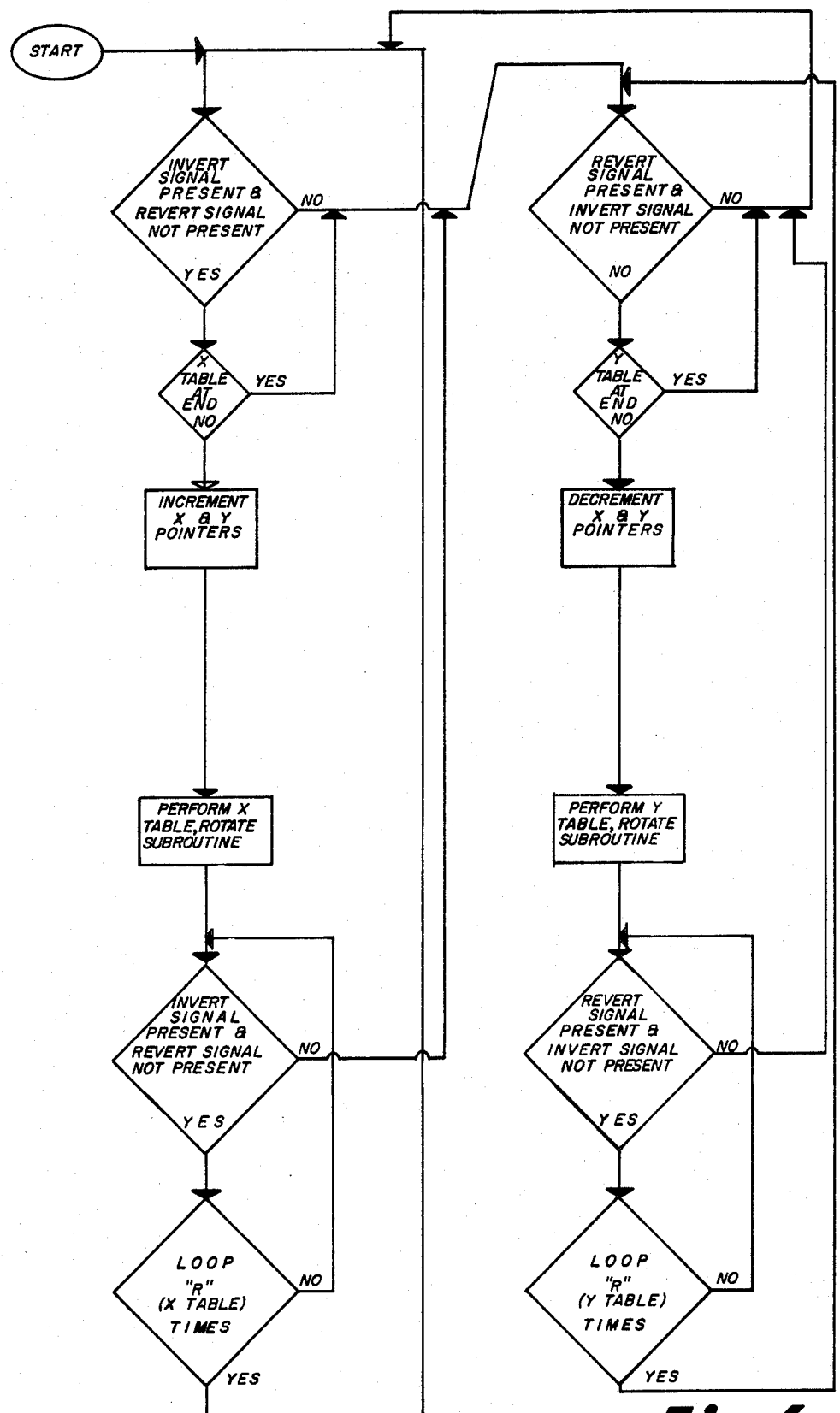
FIG. 6 is a flow diagram illustrating a method of operating an individual function microcomputer in accordance with the present invention where prior art electronic control units provide control over both modes of a component's movement.

As will be appreciated by those skilled in the art, the program illustrated on the flow chart of FIG. 6 is designed to be compatible with present electronic section control units. As previously described, such control units typically function by turning on and off various solenoid valves which allow pressurization of the pneumatic cylinders which drive the components in the glass forming machine. Some components in the glass forming machine, such as the funnel, baffle and blow head, are driven in one direction and then returned by spring or other means. With these components the present electronic control units activate a solenoid to initiate movement of the components in a first mode. The solenoid remains activated until the appropriate time in the glass forming cycle is reached for the component to return in a second mode of movement to its original position. At this time the solenoid is deactivated and the component is allowed to return to its original location by mechanical means outside the control of the electronic control unit.

Other components, such as the invert-revert arm, blank mould, blow mould and takeout arm, are driven in one direction, and then driven back to their original position by either a second pneumatic cylinder or through the use of a dual-acting pneumatic cylinder. The invert-revert arm is typically driven in both directions. For example, in present machines the electronic section control unit activates a solenoid to allow pressurization of a cylinder moving the invert-revert arm in the invert mode. The electronic section control unit is timed to turn off the solenoid after the invert mode is completed. At the appropriate point in the glass forming cycle a second solenoid is then activated to allow pressurization of a second cylinder driving the invert-revert arm in the revert mode back to its original position. The second solenoid would then be turned off after the revert position is reached. To maintain positive control over the invert-revert arm, there may be overlap between the turning off of the first solenoid and the activation of the second solenoid.

It, of course, would be possible to specifically design a control system which would merely initiate the individual function microcomputer and further communicate with the individual function microcomputer should problems arise. However, to make the present invention compatible with existing controllers, it is necessary to make use of the existing signals from the electronic control unit to the various solenoid valves. These signals will be present as long as the respective component is to be continued in motion. Should problems arise, most electronic control units have methods of immediate stopping of the machine. The present invention therefore tests for the presence of the respective solenoid energization signal from the electronic control unit, and should such signal stop, the subject invention will immediately stop the components.

Referring now to FIG. 6, a simple flow chart is illustrated which may be used to control the individual function microcomputers in accordance with the present invention. This particular program is designed to control individual function microcomputer 28 which controls the invert-revert arm of FIG. 1, but it may also be used to control any of the other components which move in a cyclical manner where control over the complete cycle is desired. With minor changes, which will be hereinafter described, this program may also be used to control components such as the baffle and funnel which are presently under electronic control only in their first mode of movement.

The program is initiated at the circle "START" and immediately enters a test point "INVERT SIGNAL PRESENT & REVERT SIGNAL NOT PRESENT" to test the input lines 35 and 36 of individual function microcomputer 28 as shown in FIG. 5. These signals will be outputted to the individual function microcomputer by the section control unit 17 of FIGS. 1 and 2 at the appropriate time in the cycle as further described in U.S. Pat. No. Re. 29,642. Assuming that the test is positive and the invert signal is present and the revert signal not present, this indicates that the glass machine is at some point in the invert mode. The test point "X TABLE AT END" is then reached to test if the invert mode has ended. If the Address Pointer X, 53, in individual function microcomputer 28 indicates the X table is at its end, the decision point "REVERT SIGNAL PRESENT & INVERT SIGNAL NOT PRESENT" is reached to again test the input lines 35 and 36 of the individual function microcomputer 28. If the electronic control unit has not yet reached the proper time in the cycle for the revert mode to begin, the program will be initiated again at "START" and proceed through the above decision points. As the present invention is designed to be compatible with existing electronic control units, this feature of the program allows the electronic control unit to continue to output the invert signal for an indefinite time after the invert mode has been completed without any effect on the components, which is also how a prior art pneumatic cylinder would act upon reaching full extension and continuing to be pressurized.

Figure 8:
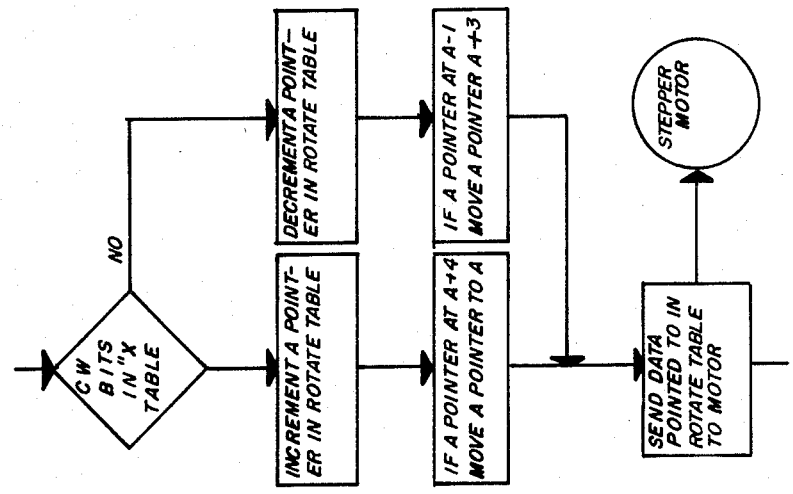
FIG. 8 is a flow diagram illustrating a subroutine for controlling the direction of a stepper motor in executing the flow diagrams of FIGS. 6 and 7.

If the test point "X TABLE AT END" indicates the X table is not at the end, the instruction "INCREMENT X and Y POINTERS" is reached resulting in Address Pointer X, 53, and Address Pointer Y, 54, being incremented to the next position in the X and Y tables. The instruction "PERFORM X TABLE ROTATE SUBROUTINE" is then executed. The Rotate Subroutine is illustrated in FIGS. 8 and 9, with FIG. 8 illustrating the subroutine for a stepper motor as above described in the preferred embodiment and FIG. 9 illustrating a subroutine for a D.C. servo motor on A.C. variable frequency motor as described above in conjunction with FIGS. 10 and 11 respectively. Both Rotate Subroutines initially cause the test "CW BIT IN X TABLE" to be performed. The CPU then executes instructions to determine if a 1 is in the first digit of the first word in the X Table which is pointed to by the Address Pointer X. Depending on the outcome of the test, the instruction "INCREMENT SET POINT COUNTER" or "DECREMENT SET POINT COUNTER" is executed in the case of D.C. or A.C. digitally responsive motor systems (FIG. 9) and the instruction "INCREMENT A POINTER IN ROTATION TABLE" or "DECREMENT A POINTER IN ROTATE TABLE" is executed in the case of the preferred embodiment stepper motors (FIG. 8). The Rotate Pointer 55 in individual function microcomputer 28 is then appropriately incremented or decremented to indicate the appropriate energization of the drive transistors 47 for proper rotation direction as illustrated in FIG. 4. With the rotate subroutine for stepper motors illustrated in FIG. 8, in the case of clockwise rotation, the instruction "IF A POINTER AT A+4 MOVE A POINTER TO A" is performed and in the case of counterclockwise rotation, the test "IF A POINTER AT A−1 MOVE A POINTER TO A+1" is performed. These instructions redirect the Rotate Pointer to the proper location in the table upon reaching either end of the Rotate Table. The instruction "SEND DATA POINTED TO IN ROTATE TABLE TO MOTOR" is then executed and the appropriate data is then output from Output Port 66 of individual function microcomputer 28 (FIG. 5) through optical isolator circuit 39 to the driver transistors QA, QB, QC and QD resulting in energization of stepper motor coils 47A, 47B, 47C and 47D for the desired rotation step of movement.

The digitally responsive motor module then moves through a single step of rotation and the instruction "LOOP "R" (X Table) TIMES" is reached in the main program. "R" (X Table) is the rate bit number pointed to in the X Table by Address Pointer X, 53, in individual function microcomputer 28. This instruction results in continued looping, with a test every loop to determine if the invert signal is still present and the revert signal not present, until the number of loops equals "R" (X Table). The program then returns to the circle "START" and is executed again.

This last instruction which provides for looping the number of times indicated by the rate bits provides the method of controlling the speed of the digitally responsive motors by delaying execution of the next step for the desired time period as indicated by the size of the number making up the rate bits.

The program continues to be executed until the X Table reaches its end and the invert mode of movement is completed. The tests are continually performed until such time as the section control unit 17 outputs a revert signal and turns off the invert signal on lines 35 and 36 to the individual function microcomputer 28. The test "REVERT SIGNAL PRESENT & INVERT SIGNAL NOT PRESENT" will then be met and the program will proceed to the test "Y TABLE AT END". If the Y Table is at an end, as indicated by a 1 in the first digit of each of the two words occupying the location Y in the data table, the program will be initiated again at "START". Assuming the first mode of movement has just been completed and the X Table is at an end which is the memory location X+N+1 as indicated in FIG. 3, the Y Table will be at the beginning for the first step of movement in the revert mode. The test "Y TABLE AT END" will be negative and the program will proceed to the instruction "DECREMENT X and Y POINTERS". This will result in the execution of a set of instructions causing the Address Pointer X and Address Pointer Y to be decremented to the respective data positions X+N and Y+N as illustrated in FIG. 3. The instruction "PERFORM Y TABLE ROTATE SUBROUTINE" will then be executed. This will result in the execution of the individual instructions above described in conjunction with "PERFORM X TABLE ROTATE SUBROUTINE" and FIGS. 8 and 9 except the test "CW BIT IN X TABLE" will be performed on the Y Table. That is, the test will be performed on the first digit of the first word which is pointed to by the Address Pointer Y rather than the Address Pointer X. This subroutine will, therefore, not be further described.

After performance of the rotate subroutine, the test "REVERT SIGNAL PRESENT & INVERT SIGNAL NOT PRESENT" is again performed to determine if the electronic section control unit 17 is still sending signals indicating the revert is to continue. If the revert is to continue, the test "LOOP "R" (Y Table) TIMES" is performed in the same manner as the instruction "LOOP "R" (X Table) TIMES" was above described except the data "R" (Y Table) is taken from the Y table at the data location pointed to by the Address Pointer Y. The program then returns to the START position and executes again.

Should, for any reason it be desired to stop the movement of the invert-revert arm, the operator could push the appropriate stop button on the prior art electronic section control unit which would turn the signal for the invert off, causing the digitally responsive motor module to stop. Both the X and the Y ramp tables are linked together, such that should it be necessary to stop the invert-revert arm in the middle of its movement, the application of revert would cause the arm to move back to the initial invert position.

Figure 7:
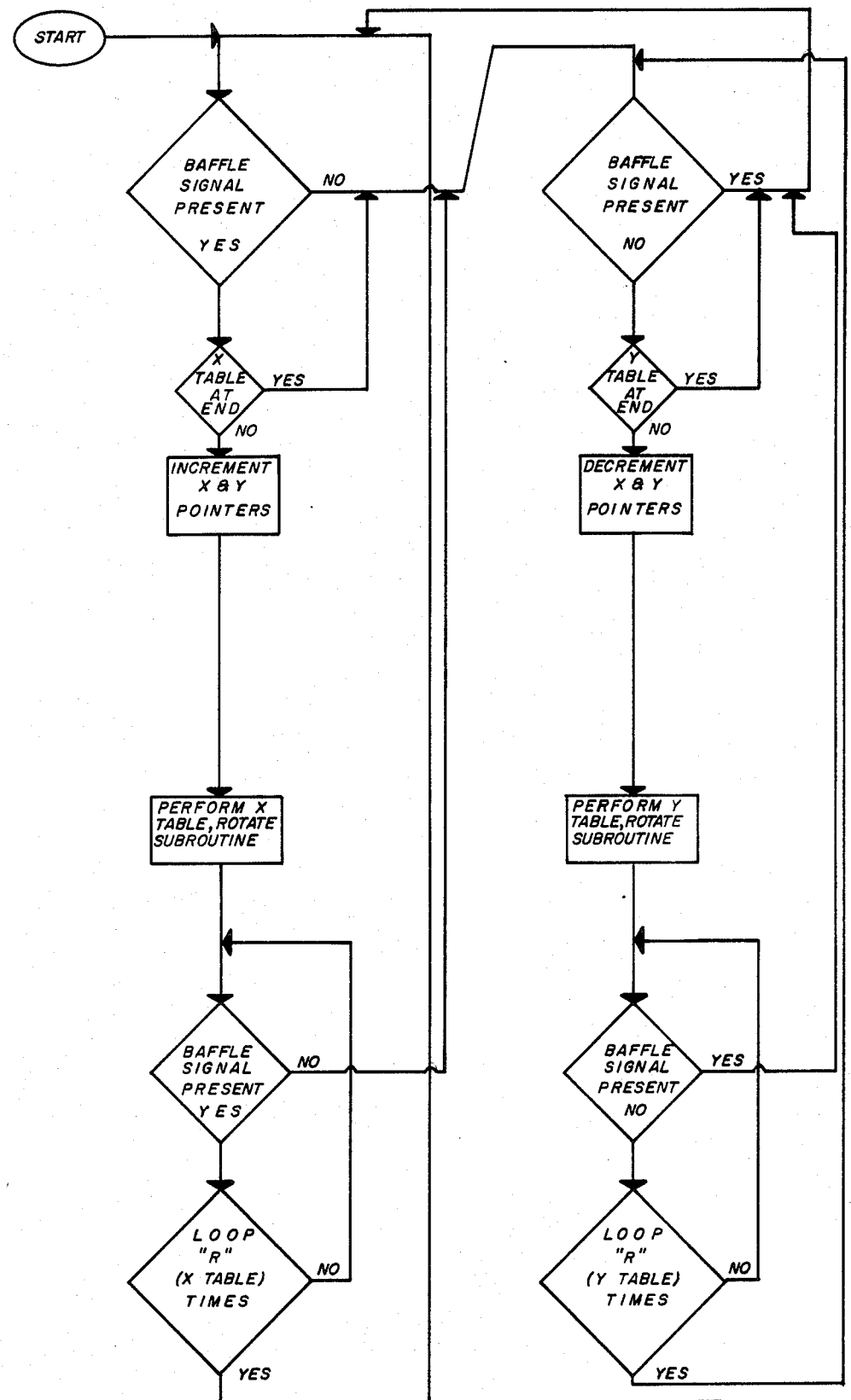
FIG. 7 is a flow diagram illustrating a method of operating an individual function microcomputer in accordance with the present invention where prior art electronic control units provide control over only a single mode of the component's movement.

The individual function microcomputers which control components such as the funnel and baffle, i.e., components which are presently driven in one direction and allowed to return by other mechanical means outside the control of the electronic control unit, would function similarly with the exception that the only test performed would be to determine if, for example, the baffle signal is present. As long as the baffle signal is present, the individual function microcomputer will continue to operate the digitally responsive motor module driving the baffle in accordance with the Ramp Table (X). Conversely, if no baffle signal is present, the individual microcomputer would assume it is desired to place the baffle back in its initiation position and operate the baffle in accordance with Ramp Table (Y). Should the baffle activate signal stop due to an emergency stop, the individual function microcomputer would place the baffle back in its initial position along Ramp Table (Y) simulating the present return by other mechanical means when air pressure is turned off to the cylinder actuating the baffle. A simple flow chart is illustrated in FIG. 7 for controlling the baffle and other single-mode components.

All individual section glass forming machines must have synchronization between the cyclical movement of the components and the glass feed to the glass forming machine. This synchronization is often provided by the use of a conventional shaft encoder which outputs a digital signal of 360 pulses per revolution of an appropriate shaft on the glass forming machine. Other methods of synchronization are equally compatible to the present invention including driving the feeder and glass forming machine with a synchronous motor through an inverter and taking a signal from said inverter to synchronize the control of the glass forming components.

To make the present invention easily adaptable to a variety of different types of glassware without changing all rate bits, the individual function microcomputer may be linked to whatever means of synchronization presently exists. For example, a glass forming machine operates at a much slower speed for large articles of glassware than for smaller articles of glassware. The operation of the various components also must be slower. This could be accomplished in the present invention by either completely changing the X and Y ramp tables for different sizes of glassware and providing different rate bits, or the speed of the loop which determines the time period for a rate bit could be changed. As the speed of the glass machine increases, the time period for a single loop or the time which is accorded a single rate bit, could also decrease. This could be simply accomplished by defining the speed of the loop by reference to the period between pulses from the pulse generator or other synchronization means.

For example, an interrupt timer 68 (FIG. 5) could be provided to interrupt the program on a frequent basis between the rising edge of two pulses from the pulse generator or other synchronization means and go to a subroutine which would increment a binary counter during the interrupt. The binary counter would then provide an indication of the frequency of the pulse generator. This binary counter could then be used to provide the frequency of the loop routine in the main program with respect to the rate bits. For example, if the machine speed is relatively slow as with large glass articles, the pulses from the pulse generator will have relatively large periods between them. The binary counter initiated by the interrupt timer subroutine would count a relatively large number between pulses. The number accumulated in the binary counter would be used to provide a relatively slow frequency of looping in the portion of the program which provides for looping the number of times indicated by the rate bits. This would provide a direct link between the machine speed and the various component speeds and allow an optimized X or Y data table to be used on a variety of glassware production at different speeds. It would also be possible to provide each individual function microcomputer with a number of separate data tables which could be appropriately selected from the central control unit. Different data tables could also be available for starting and stopping the machine and/or for emergency stopping of the machine.

In the high-speed production of certain ware it may be desirable to gradually slow certain components to a stop in emergency situations or other situations where the present controllers stop sending an actuation signal in the middle of a component's motion envelope. The preferred embodiment of the subject invention, as above described, would immediately stop a component upon ceasing to receive an actuation signal from the electronic control unit. Where the component is one which is presently under only a single mode of electronic control, the subject invention, in addition to immediately stopping the component upon ceasing to receive an actuation signal, would reverse the direction of the component immediately. The extra acceleration which the component and any ware in the component would undergo in such transitions may be unacceptable under some circumstances. This can be easily remedied by providing a test of the rate bit number pointed to at each instance such a transition is initiated. If the number is greater than a predetermined safe magnitude, the component can be safely stopped as a relatively high magnitude rate bit number would indicate slow speed. If the rate bit number is below said predetermined safe magnitude, a subroutine could be entered which would utilize the existing number and increase it by predetermined amounts, executing the step in movement for each increase, until the predetermined safe magnitude of rate bit is reached thereby slowly decelerating the component. The subroutine would also keep track of the steps necessary to perform the stop and could then move the component back to the step last pointed to in the tables at the time the stop or change in direction is initiated. Alternatively, the subroutine could increment the ramp tables, although not using the data, so that the words in the rate table which are pointed to correspond to the appropriate resting position of the component. A similar subroutine could be used at anytime motion of a component is to be initiated from a position other than at the beginning of the appropriate rate table, for example after an emergency stop. Upon receiving an actuation signal a test would be performed to determine if the pointed to rate bit was smaller than a predetermined safe magnitude. If the number were larger than the predetermined safe magnitude, the component's motion would be initiated in accordance with the ramp table. If the rate number were smaller than said predetermined safe magnitude, an initial calculation would be performed to determine the number of steps necessary to safely achieve the speed corresponding to the pointed to rate bit number. The component would then be driven in reverse, the number of steps so determined and gradually accelerated in the correct direction with control being turned back over to the ramp table at the appropriate step.

In its broadest aspects, the present invention contemplates a method and apparatus for precisely controlling the motion of at least one of the components in a glass-forming machine by mechanically linking said component to a digitally responsive motor module, providing data corresponding to the desired motion of said component in a first storage means, and controlling the motion of said component through a component controller connected to said storage means and said digitally responsive motor module. In the preferred embodiment said data comprises a ramp table having a dedicated data grouping for each increment of movement of said component, said grouping including an indication of the direction of movement of said component, whether said component is at the beginning or end of a motion envelope, and the time period for an increment of movement of said component. A refinement to said invention is the ability to utilize an optimized data table for a component over a variety of machine speeds by linking the time period defined by said data grouping to the machine speed. A further refinement is the elimination of excessive accelerations of said components when emergency stopping the glass-forming machine. The preferred embodiment is compatible with the majority of presently available electronic controllers used in the glass-forming industry with minimum modification.

I claim:

1. In a glassware forming machine having a plurality of components which cyclically move in synchronized concert, the improvement of an apparatus for precise control over the motion envelope of at least one of said components, comprising:
    a digitally responsive motor module for driving said component;
    a first storage means for storing a first data table corresponding to a first desired motion envelope of said component, from a first position to a second position, said data table including an identified location for each unit movement of said digitally responsive motor module, said each identified location of said data table having data indicative of the relative time between a unit movement of said digitally responsive motor module and data indicative of the direction of said movement;

a second storage means for storing a second data table corresponding to a second desired motion envelope of said component from said second position to said first position;

means for controlling said digitally responsive motor module in accordance with said stored data;

means responsive to the speed of said glass forming machine for altering the real time significance of said data indicative of the relative time between a unit movement of said digitally responsive motor module in proportion to a change in the speed of the glass forming machine; and, emergency stop means to test the speed of a respective component upon execution of an emergency stop and uniformly de-accelerate said respective component to the extend said components speed is in excess of a predetermined speed.

2. In a glass forming machine having a plurality of components which cyclically move in synchronized concert, a method of precisely controlling the motion envelope of at least one of said components, comprising the steps of:

driving said component with a digitally responsive motor module;

providing a data table having an identified location for each unit movement of said digitally responsive motor module;

providing a directional indicator and a rate indicator for each of said identified locatons in said data table;

outputting a signal for a unit movement of said digitally responsive motor module in accordance with said directional indicator;

delaying further operation of said digitally responsive motor module in accordance with said rate indicator;

repeating said outputting and delaying steps for subsequent identified locations in said data table; and executing an emergency stop of said component by the steps of testing said rate indicator to determine if an excess de-acceleration of said component will be encountered by said emergency stop, providing alternate rate indicators to de-accelerate said components in a predetermined manner, and de-accelerating said component in accordance with said alternate rate indicator.

3. A method of operating a glassware forming machine having a plurality of components which cyclically more in synchronized concert, at lest some of said components being critically controlled within narrow motion envelopes, comprising the steps of:

providing a timing signal which is synchronized to the cyclic operation of the machine;

storing, in a memory means, the relative actuation times in the cycle for the various components;

generating an actuation signal when the actuation time of a component is reached;

mechanically linking said critically controlled component to a digitally responsive motor module;

providing a first data table having an identified location for each unit movement of said digitally responsive motor module corresponding to the movement of said component from a first position to a second position;

providing a directional indicator and a rate indicator for each of said identified locations in said data table;

upon receipt of said actuation signal, outputting a signal for a unit movement of said digitally responsive motor module in accordance with said directional indicator;

delaying further operation of said digitally responsive motor module in accordance with said rate indicator;

repeating said outputting and delaying steps for subsequent locations in said data table;

testing for said actuation signal and stopping said outputting and delaying steps upon the cessation of said actuation signal; and testing the speed of said component indicated by said rate indicator upon the cessation of said actuation signal and de-accelerating said component in a predetermined manner if said speed is in excess of a predetermined limit.

4. The method of claim 3 including the steps of providing a second data table having an identified location for each unit movement of said digitally responsive motor module corresponding to the movement of said component from said second position back to said first position.

5. The method of claim 4 including the steps of determining the speed of said glassware forming machine through said timing signal and proportionally varying the real time significance of said rate indicator in accordance with changes in the speed of said glassware forming machine.

* * * * *